(No Model.)

W. WALLACE.
DUMPING WAGON.

No. 273,202. Patented Feb. 27, 1883.

WITNESSES:
Chas. O. Nahlers.
William Miller

INVENTOR
William Wallace
BY Van Santvoord & Hauff
ATTORNEYS

UNITED STATES PATENT OFFICE.

WILLIAM WALLACE, OF NEW YORK, N. Y.

DUMPING-WAGON.

SPECIFICATION forming part of Letters Patent No. 273,202, dated February 27, 1883.

Application filed November 4, 1882. (No model.)

*To all whom it may concern:*

Be it known that I, WILLIAM WALLACE, a citizen of the United States, residing at New York, in the county and State of New York, have invented new and useful Improvements in Wagons, of which the following is a specification.

This invention relates to that class of dumping-wagons composed of two pivoted boxes constituting the vehicle-body, one arranged to dump in front of the rear axle and the other to dump behind said rear axle.

The object of my invention is to provide the side bars with standards, from the upper ends of which are suspended the tail-boards of the respective dumping-boxes; and to such end my invention consists in the combination and arrangement of the parts hereinafter described and claimed, and illustrated in the accompanying drawings, in which—

Figure 1:
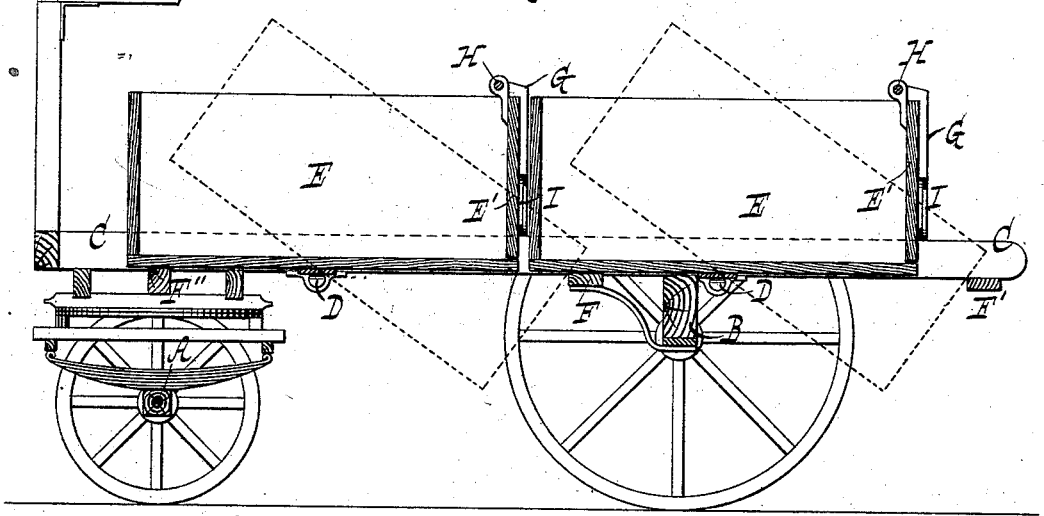
Figure 2:
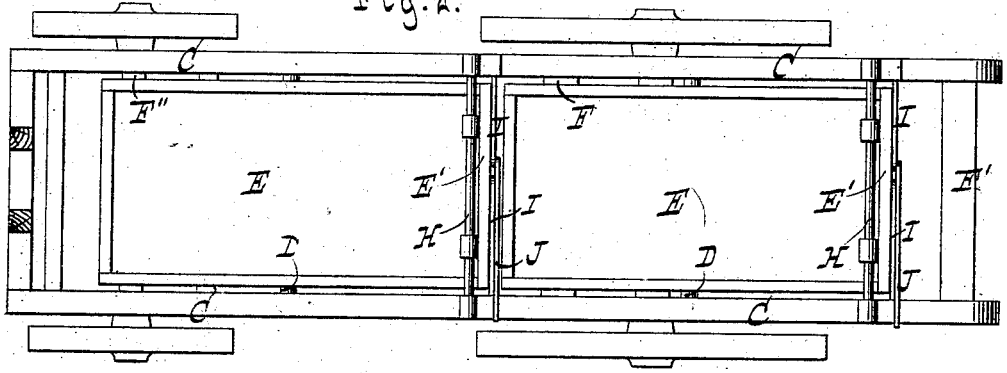
Figure 3:
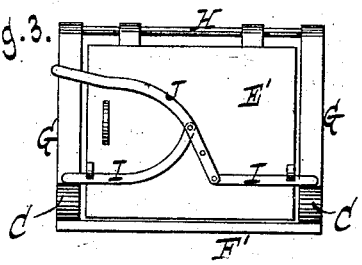

Figure 1 represents a longitudinal vertical section. Fig. 2 is a plan or top view. Fig. 3 is an end view, omitting the running-gear.

Similar letters indicate corresponding parts.

The letter A designates the forward axle, and B the rear axle, supporting the sills C C, which form the bearings for shafts D D, whereby the bodies E E, of box shape, are pivoted, one to empty between the fore and hind axles, and the other to empty rearward of the hind axle, as indicated by dotted lines in Fig. 1. When the bodies E E are dumped for emptying the same, their rear vertical edges strike against cross-bars F F', secured to the sills C C, and by this means the bodies are prevented from dragging on the ground.

From the sills C C rise standards G G, to which are hung, by means of shafts H H, the tail-boards E' E' of the wagon-bodies, and when the bodies are dumped these tail-boards remain suspended from the shafts, so that they require no handling or adjustment either in dumping the bodies or returning the same to their normal positions.

For the purpose of locking the wagon-bodies in their upper or normal positions, I make use of bolts I I, (best seen in Fig. 3,) which are arranged to be operated by a lever, J, and to catch over the sills C C, the whole being applied to the tail-board of the respective bodies. In said normal positions of the bodies E E the forward portion of the rear body rests on the cross-bar F, and the corresponding portion of the forward body rests on a cross-bar, F'', which, like the bars F F', is secured to the sills.

I am aware that a dumping-wagon has heretofore been provided with two pivoted boxes adapted to dump, respectively, in front and rear of the rear axle, and that in another instance the end-gate of a cart has been attached to the ends of bars, the other ends of which are pivoted to the sides of the cart-body, guide-rods being so connected with the end-gate and wagon-body that the gate is automatically opened when the cart is dumped.

What I claim as new, and desire to secure by Letters Patent, is—

In a dumping-wagon, the combination of the side sills, C C, the two front and rear sets of standards, G G, rising from the side sills, and each having secured to its upper end a transverse shaft, H, the two tail-boards E' E', each having its upper end suspended directly from one of the transverse shafts, and two pivoted boxes, one for each tail-board, and arranged to dump, substantially as shown.

In testimony whereof I have hereunto set my hand and seal in the presence of two subscribing witnesses.

WILLIAM WALLACE. [L. S.]

Witnesses:
  W. HAUFF,
  CHAS. WAHLERS.